United States Patent [19]
Spilker

[11] Patent Number: 5,477,195
[45] Date of Patent: Dec. 19, 1995

[54] NEAR OPTIMAL QUASI-COHERENT DELAY LOCK LOOP (QCDLL) FOR TRACKING DIRECT SEQUENCE SIGNALS AND CDMA

[75] Inventor: James J. Spilker, Woodside, Calif.

[73] Assignee: Stanford Telecommunications, Inc., Sunnyvale, Calif.

[21] Appl. No.: 353,208

[22] Filed: Dec. 1, 1994

[51] Int. Cl.$^6$ .............................. H03L 7/00; H04K 1/00
[52] U.S. Cl. ..................... 331/11; 331/17; 331/DIG. 2; 375/208; 329/304
[58] Field of Search .................... 331/11, 12, 17, 331/DIG. 2; 329/304; 375/208, 209, 210, 200–207

[56] References Cited

U.S. PATENT DOCUMENTS 4,538,280  8/1985  Mosley, Jr. et al. ............... 375/343 X

*Primary Examiner*—David Mis
*Attorney, Agent, or Firm*—Jim Zegeer

[57] ABSTRACT

A received carrier containing pseudonoise-modulation and with additive noise is correlated with a local pseudonoise signal having the same binary sequence but an unknown time delay. A second correlation is performed using a signal derived from the local pseudonoise signal (in a preferred embodiment, its time derivative). The bandpass filtered outputs of the two correlators are used as inputs to a third correlator, whose low-pass filtered output controls the time delay of the local pseudonoise signal to form a delay lock loop in which the delay may be measured and low-frequency modulation extracted from the signal. This delay lock loop has improved noise rejection as compared to prior art loops, and does not experience the "cycle slip" effects observed in coherent delay lock loops of conventional design. The invention relates to a new near-optimal method of tracking and demodulating direct sequence and other spread spectrum signals that is superior to those commonly used in signal tracking systems: such as, in navigation satellites signal tracking, and code division multiple access (CDMA) systems for wireless communications.

5 Claims, 5 Drawing Sheets

NEAR OPTIMAL QUASI-COHERENT DELAY LOCK LOOP (QCDLL) FOR TRACKING DIRECT SEQUENCE SIGNALS AND CDMA

BACKGROUND OF THE INVENTION

The delay lock loop (DLL) was first described by the present inventor in the technical literature in 1961. In some sense it can be viewed as a generalization of the phase lock loop where the delay correction signal for the tracking loop is formed by the product of the received signal s(t+$\epsilon$) with a differentiated reference signal s' (t). For a sinewave, of course, this operation corresponds to multiplying the received signal, cos ($\omega_o$+$\phi$), with the differentiated signal which of course is $\omega_O$ sin ($\omega_o$t+$\phi$). If the received signal has delay $\tau$ and the reference signal uses the estimate of delay $\hat{\tau}$ (or $\hat{\phi}$), the low pass output of the multiplier gives a delay or phase correction signal for small error of $$\cos (\omega_o(t+\tau)+\phi) \sin (\omega_o(t+\hat{\tau})+\hat{\phi}) \equiv \omega_o\epsilon+ \ldots \text{ for } \omega_o\epsilon<<1$$

where $\epsilon=\tau-\hat{\tau}$ as in the commonly used phase lock loop. Likewise, in the delay lock loop the product of the received signal and the differentiated reference has a low pass output $$s(t+\tau) \; s'(t+\hat{\tau}) \equiv R'(\epsilon)+ \ldots \equiv R''(0)\epsilon \text{ for small } \epsilon$$

Thus, in both examples the tracking loop recovers a component that is directly proportional to delay error. If the value of $\tau$ should suddenly increase the value of $\epsilon$ increases and the DLL increments $\hat{\tau}$ to a larger value to track the received signal delay $\tau$.

The quasi-coherent delay lock loop can be likened to a generalization of the Costas Loop for tracking sinusoidal signals (see Spilker "Digital Communications by Satellite", 1977) for data modulated signal wherein one channel is phase shifted by 90° with respect to the other. If the sine wave is biphase data modulated by d(t) then the product of the in-phase and quadrature channels is $$[d(t) \cos (\omega_o(t+\tau)+\phi)][d(t) \sin (\omega_o(t+\hat{\tau})+\hat{\phi})] \equiv \sin \omega_o\epsilon \equiv \omega_0\epsilon+ \ldots$$

where the $d^2(t) =1$ term cancels.

In the quasi-coherent DLL we form the two products of punctual channels for the in-phase, I, received signal $$[d(t)s(t+\tau) \cos \omega_o t+\phi][s(t+\hat{\tau})] \equiv d(t)R(\epsilon) \cos (\omega_o t+\phi)+ \ldots$$

and the corresponding in-phase tracking channel product is $$e_I(t)=[d(t)s(t+\tau) \cos (\omega_o(t+\tau)+\phi)][s'(t+\hat{\tau})] \equiv d(t)R'(\tau) \cos (\omega_o t+\phi)+ \ldots$$

The product of these two in-phase terms yields $$d^2(t)R(\epsilon)R'(\epsilon) \cos^2(\omega_o t+\phi) \equiv R(\epsilon)R'(\epsilon) \cos^2(\omega_o t+\phi)+ \ldots$$

Likewise, the corresponding product for the quadrature channel $$e_Q(t)=d^2(t)R(\epsilon)R'(\epsilon) \sin^2(\omega_o t+\phi) \equiv R(\epsilon) R'(\epsilon) \sin^2(\omega_o t+\phi)+ \ldots$$

These two products can be added together to form $$z_I=z_I+z_Q=R(\epsilon)R'(\epsilon)[\cos^2(\omega_o t+\phi) +\sin^2(\omega_o t+\phi)]=R(\epsilon)R'(\epsilon) \triangleq D(\epsilon)$$

where D($\epsilon$) is the discriminator characteristic and for small $\epsilon$ $$D(\epsilon) \equiv R(O)R''(O)\epsilon \text{ for small } \epsilon$$

Thus, the output $e_T$ contains a term directly proportional to delay error $\epsilon$ as desired.

The design of prior art delay lock loops has been based on the assumption that the digital modulation in the received signals has zero rise time (i.e. zero transition time between the digital signal states) and is not optimum even for that signal. Since real signals are always band-limited signals, the rise time is, in reality, always finite.

Prior art delay lock loops determine exact signal delay by comparing correlations of the input signal with reference signals which differ in time sequence by one interval at the pseudonoise chip rate (FIGS. 1a and 1b). They are characterized as coherent if early and late correlation signals are compared from signals in which the carrier frequency (or intermediate frequency) component has been removed prior to correlation, or noncoherent if the carrier phase is not known and must be included in the correlation. The present invention is characterized as "quasi-coherent", to distinguish it from conventional delay lock loops, because carrier phase information is removed only after correlation of punctual (signal) with tracking channel information.

The closest previously published tracking system related to the QCDLL has been described by Holmes, 1990, p. 481, and by Simon et al. 1985. Simon et al. describes the Modified Code Tracking Loop (MCTL) which also uses punctual, and tracking channel multipliers and forms the product of the two to form an error signal. This system also gives improved performance over the conventional noncoherent DLL. However, these references discuss only zero rise time signals and only discuss the use of a tracking channel reference which is the difference between early and late zero rise time PN codes where the early and late spacing is one PN code chip (the same separation proposed by the present inventor in a 1963 paper). These systems are all nonoptimal and the presently described QCDLL provides significant performance advantages over those previously described.

SUMMARY OF THE INVENTION

The invention can be implemented using analog or digital circuits supplied from superheterodyne frequency-translation and amplifier circuits and conventional analog-to-digital sampling converters.

The received signal, S (t), with intentional interference and other noise components n (t) added to it, is received conventionally in a superheterodyne receiver which translates (down converts) the carrier frequency to an intermediate frequency (IF) and amplifies this frequency-translated signal. The IF signal enters two multiplier circuits, one receiving a, punctual reference signal which is the direct output of a pseudonoise generator or filtered pseudonoise generator and the second receiving a differentiated reference signal which is the time derivative of that output. The IF-frequency components of the outputs of the two multipliers ($p_o(t)$ and $m_o(t)$) are, in turn, multiplied together in a third multiplier, whose output z(t) is passed through a filter that removes the IF frequency signal. The filtered signal is the tracking signal used to control the numerically controlled (variable-frequency) oscillator. The loop gain or the tracking channel reference signal is adjusted during acquisition and then the loop gain is reduced to its optimal (thermal noise steady state condition) once the loop has completed its acquisition mode.

The invention provides the following advantages:

Increased tracking accuracy in the presence of noise as compared to the conventional and modified noncoherent early-late gate delay lock loops (see Spilker, 1977, Chapter 18, and U.S. Pat. No. 5,100,416 to Fenton et al., which employs a standard early-late gate delay lock loop with variable early-late reference spacing).

This invention is simpler to implement than other noncoherent techniques when digital implementations are employed since only one additional correlator is required rather than the two required of early correlator-late correlator delay lock techniques. Digital implementation of the invention permits one, to match the delay and phase in the filters in each channel. With ordinary analog filters and the relatively long delay required for a GPS receiver (where the ratio of the RF signal bandwidth to IF filter bandwidth is on the order of $10^2/10^3=10^4$), the time delay stability in such filter would have to be proportionately high—difficult for analog filtering but easy for digital filtering. If the filter delays and phases were not stable and the carrier phase were to drift 180°, the loop gain would reverse sign and become unstable and not work properly.

Improved performance in the presence of multipath interference since the discriminator curve is not as wide and hence not as sensitive to a multipath signals delayed by more than a chip. Many other systems can be sensitive to multipath signals delayed 50% longer.

This invention has nearly the performance and does not suffer from the problems of completely coherent delay lock loops which are subject to losing code lock when a cycle slippage occurs in the carrier tracking operation. The QCDLL receiver uses a simple matched punctual channel correlator to recover an estimate of the carrier and data modulation using filtering rather than employing fragile hard decisions and phase lock loops of a coherent loop. Thus the receiver achieves nearly the same performance advantages of a coherent DLL without the sensitivity of carrier phase cycle slips.

The tracking channel uses the optimum reference signal which is the differentiated reference signal (or an approximation thereto). This tracking channel reference signal has the advantage that it time gates off much of the noise without removing useful tracking information or correspondingly weights the received signal in accord with the slope of the received signal. As used herein:

The term near optimal is used in the sense that it achieves near-minimum rms delay error in the presence of received thermal noise when the received signal has sufficient signal level, i.e., above the threshold noise level.

Quasi-coherent is a term used to describe a receiver which generates a data modulated reference carrier in the punctual channel that is good estimate of the actual received data modulated carrier.

BRIEF DESCRIPTION OF THE DRAWINGS

The above and other objects, advantages, and features of the invention will become more apparent when considered with the following specification and accompanying drawings wherein.

DETAILED DESCRIPTION OF THE INVENTION

Analog Implementation: Consider a typical GPS signal or CDMA waveform of the form $$S(t)=d(t)\ s(t)\ \cos\ (\omega_o t+\phi)$$

where d(t) is a data modulation that one desires to receive, s(t) is a finite rise time realizable PN pseudonoise signal, and $\cos\ (\omega_o t+\phi)$l represents the RF carrier. The signal received by the receiver is received with path delay, $\tau$, the quantity to be estimated, namely $$S(t+\tau)=d(t+\tau)\ s(t+\tau)\ \cos\ (\omega_o(t+\tau)+\phi)$$

We wish to estimate the delay $\tau$ precisely, both from the standpoint of estimating the so-called pseudorange in a GPS system, or for a CDMA system, simply to develop a signal which cross correlates accurately with the received signal. The primary emphasis here is on the GPS delay estimation task. The signal s(t+$\tau$) is received with a large amount of noise and other interference, and other multiple access signals of the same form as S(t) but utilizing different codes.

Figure 2:
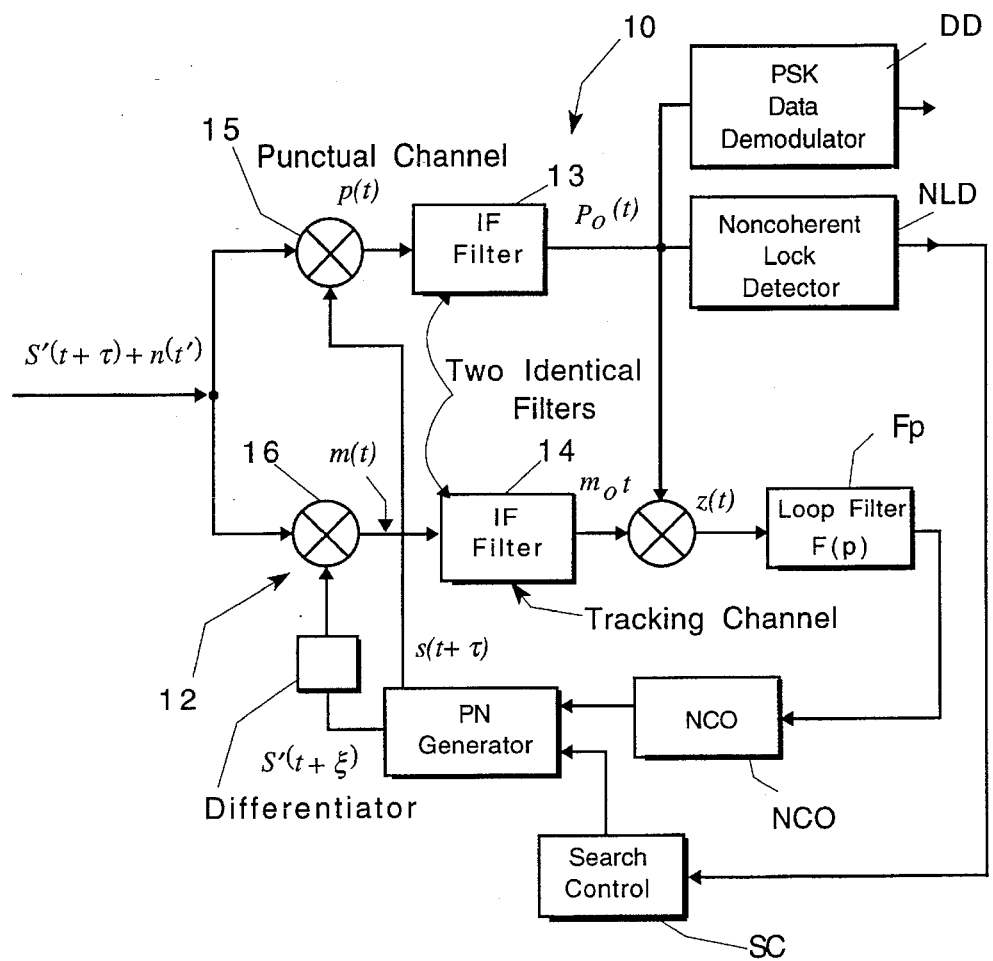
FIG. 2 shows an analog circuit implementation of a preferred embodiment of the invention.

The near optimal quasi-coherent delay lock loop for this signal is of the form shown in FIG. 2.

The quasi-coherent delay lock loop (QCDLL) operates with two channels, an upper channel (punctual). 10 that provides a punctual reference signal s(t+$\hat{\tau}$) where $\hat{\tau}$ is the delay estimate and a lower tracking channel 12, the tracking channel, m($\tau$, that employs s' (t+$\hat{\tau}$) as the reference. The product 9 of the two channel outputs after bandpass filtering 13, 14 provides a signal, e(t), that is proportional to $\epsilon=\tau-\hat{\tau}$ and permits the system to track just as in other forms of the delay lock loop. Lock detector 5 outputs a lock signal to search control 4. Preferably, the receiver would be implemented as a digital receiver by A/D converting the signal at IF prior to the two multiplication operations.

The two bandpass filters 13, 14 in FIG. 2 must be identical or close to it in order that the signal delay and phase are properly matched at the output of the receiver. The upper punctual channel or something similar must be part of almost every PN receiver in order to receive the data. Thus, the punctual channel does not constitute additional hardware in the present invention.

Figure 3:
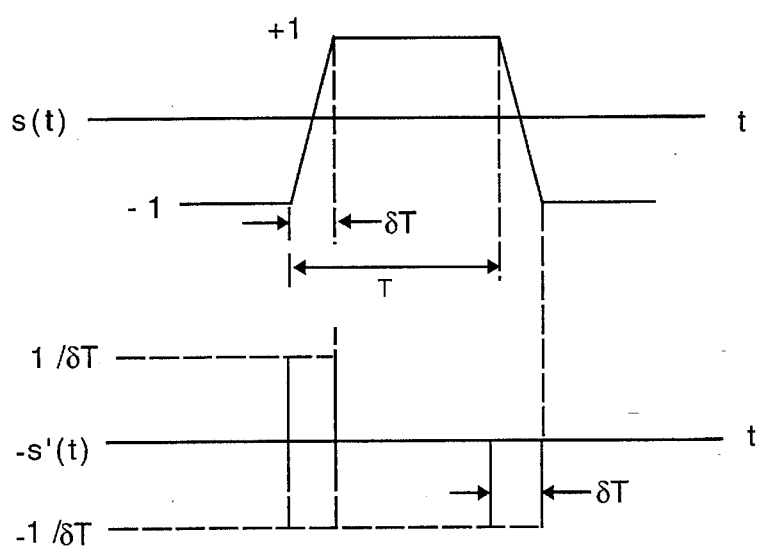
FIG. 3 depicts the differentiated reference signal, for a reference signal with finite rise time, and a trapezoidal waveshape, FIG. 4 plots the autocorrelation function for a finite rise time pseudonoise signal, in the case for which rise time is 25% of the transition interval, or chip interval, FIG. 5 plots the derivative of the autocorrelation function of FIG. 4, FIG. 6 plots the discriminator characteristic, which characterizes the tracking signal value for a given delay error, for a quasi-coherent delay lock loop according to the invention, for various value of the ratio of signal rise time to chip interval of 0.125, 0.25, 0.50, and 1.0, FIG. 7A plots the discriminator characteristics for a tracking channel reference pulse width (or signal rise time) equal to the pulse width (larger curve) and equal to 25% of the pulse width.

The lower channel 12, the tracking channel, utilizes a reference signal s' (t+τ). The loop path includes filter 8 and NCO 7 controlling PN generator 6. For a trapezoidal shaped PN signal with rise time, δT, the waveform and differentiated reference are as shown in FIG. 3.

Thus, for this waveform the differential reference constitutes a ternary signal. Although not all transmitted PN signals are exactly trapezoidal in shape they all have a finite rise time and a trapezoidal wave shape is a reasonable approximation. Thus, we can often use an easy to implement ternary waveform as the tracking channel reference signal. Furthermore, it may be convenient to widen the width of the ternary reference during initial acquisition and narrow it after the operation is concluded in order to obtain optimal noise performance, or alternatively increase the loop gain during acquisition.

Figure 4:
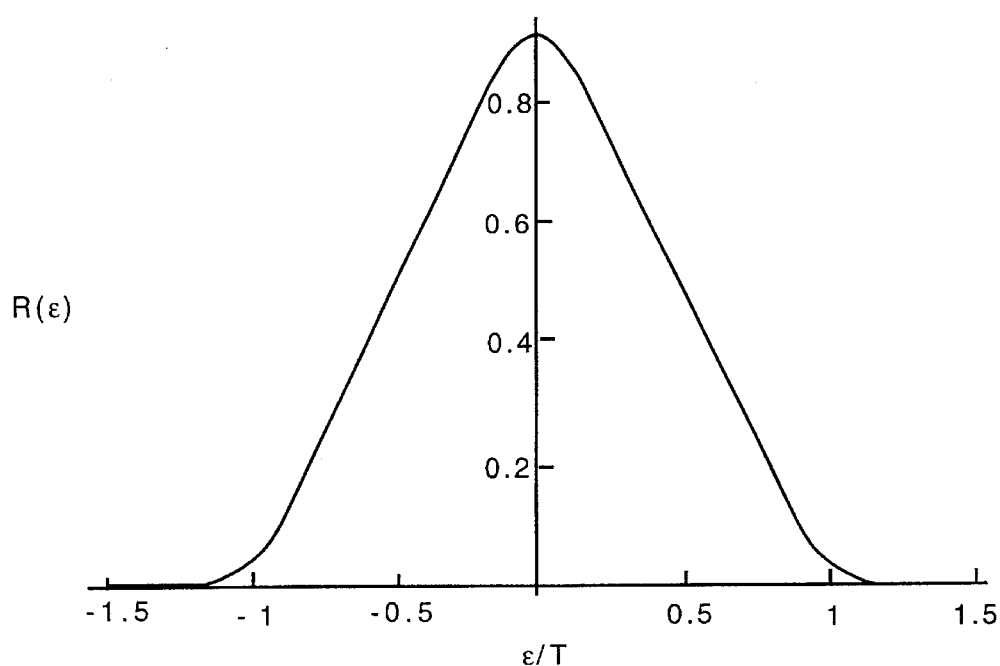

The Output of the punctual channel multiplier 15 is $$p(t) = [d(t+\tau)s(t+\tau)\cos \omega_0 ((t+\tau)+\phi) + n(t)]s(t+\hat{\tau})$$
$$= d(t+\tau)s(t+\tau)s(t+\hat{\tau})\cos(\omega_0(t+\tau)+\phi) + n_s(t)$$

where $n_s(t)=n(t) s(t+\tau)$ is white gaussian noise if N9t) is white gaussian noise. After IF filtering in 13, the punctual channel output is approximated by $$p_o(t) = d(t+\tau) R(\epsilon) \cos (\omega_o(t+\tau)+\phi) + n_{so}(t) + n_{sn}(t)$$

where $R(\epsilon)=E[s(t+\tau) s(t+\hat{\tau})]$ is the signal autocorrelation function and $\tau - \hat{\tau}z,1 \epsilon$ is the delay error. FIG. 4 shows an example plot of the autocorrelation function for a normalized signal rise time δT/T=0.25. The noise terms $n_{so}$ and $n_{sn}$ are the IF filtered noise and self-noise respectively. The noise has been reduced significantly by the bandpass filter operation which reduces the noise from an original bandwidth $B_{rf}$ to a smaller bandwidth W of the IF filter $W/B_{rf} \ll 1$.

Figure 5:
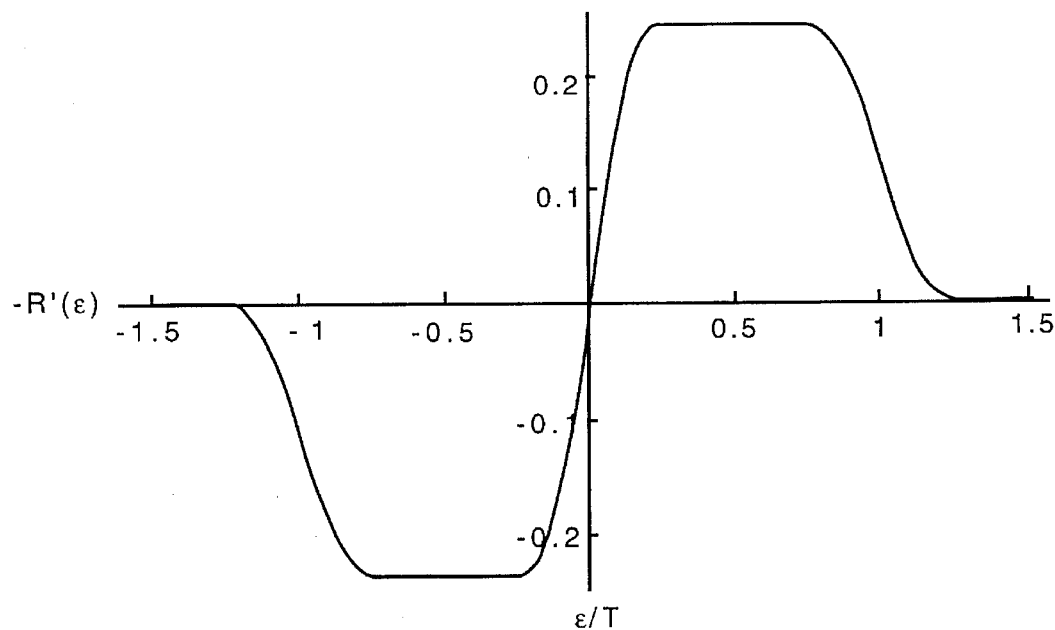

The output of the tracking channel multiplier 16 is $$m(t) = [d(t+\tau)s(t+\tau)\cos(\omega_0 t+\tau)+\phi) + n(t)]s'(t+\hat{\tau})$$
$$= d(t+\tau)s(t+\tau)s'(t+\hat{\tau})\cos(\omega_0(t+\tau)+\phi) + n(t)s'(t+\hat{\tau})$$

and n and n(t) s' (t+$\hat{\tau}$) is time gated gaussian noise and is reduced in power by the factor δT/T because of the duty factor of s' (t). The tracking channel reference s' (t) is non zero only at a PN sequence transition and then only for a pulse duration δT. Thus for a small rise time signal δT<<T most of the noise is gated off. (Note that exactly the same effect occurs in the optimal coherent delay lock loop.) Note that the tracking channel multiplier 16 has a ternary signal input s' (t+$\hat{\tau}$) which simplifies its implementation. The output of the bandpass filter 14 is of the form $$m_o(t) \cong d(t+\tau)R'(\epsilon) \cos (\omega_o(t+\tau)) + n_{sno}(t) + n_o(t)$$

where the noise output $n_{sno}$ is now no longer time gated but is reduced in power both by the time gating and the bandwidth reduction of the IF filtering $W/B_{rf}$. The quantity R' (ε) is the differentiated autocorrelation function and is proportional to the delay error E for ε T, i.e., small delay error compared to the PN chip interval T. FIG. 5 shows a plot of the differentiated autocorrelation function for a trapezoidal waveshape signal with a rise time εT/T=0.25.

The output of the third multiplier is z(t)

$$z(t) \cong d^2(t+\tau) \cos^2(\omega_o(t+\tau)+\phi) R'(\epsilon)R(\epsilon) + n_{so}(t) n_{sno}(t) + d(t+\tau) \cos$$

$$(\omega_o(t+\tau)+\phi)[R' (\epsilon)n_{so}(t) + R(\epsilon)n_{so}(t)]$$

Note that $d^2(t+\tau)=1$ and $\cos^2 \omega_o(t+\tau)+\phi)=½+2\omega_o$ terms. The $2\omega_o$ term are removed by low-pass filtering inherent in the multiplier. Thus $$z(t) \cong R'(\epsilon) R(\epsilon) + (R'(\epsilon)n_a(t)+R(\epsilon) n_b(t)) + n_{so}(t)n_{mo}(t).$$

The term R' (ε) R(ε) is the discriminator curve which is the product of the quasi triangular autocorrelation function of s(t) and the discriminator function R' (ε). Thus the product of R' (ε) R(ε) has the form shown in FIG. 4 and gives an output proportional to ε for small ε<<T.

Figure 6:
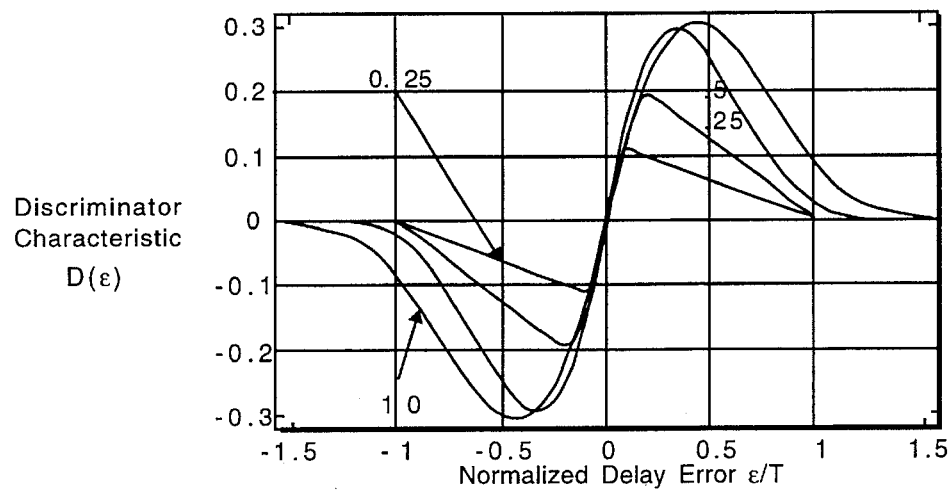

FIG. 6 shows a set of normalized discriminator characteristics $$D(\epsilon) = -R(\epsilon)R'(\epsilon)/\delta T$$

where R' (ε) has been reduced by δT to correspond to a differentiated signal s' (t)/δT with unit pulse amplitude. FIG. 6 shows D(ε) for normalized signal rise time δT/T=0.125, 0.25, 0.5, and 1.0. Notice that all curves have the same slope at ε=0. Thus, they all have the same linearized gain, D' (O). The width and peak amplitude, however, diminish with decreasing rise time δT.

For a small value of delay error the noise term R' (ε) ≅0 and the R(ε) ≅1 and the output z(t) is then approximately $$z(t) \cong R'(\epsilon)R(\epsilon) + n_b(t)$$
$$\cong R''(0)\epsilon + n_b(t)$$

Thus the output z(t) has a term proportional to ε.

The loop filter (F(p)) can be designed with variable gain and a second order transfer function so that the closed loop response is critically damped and has closed loop transfer function (see Spilker, 1977 for a discussion of closed loop tracking functions) is then $$\frac{\hat{\tau}(t)}{\tau(t)} = H(p) = \frac{1}{1+\sqrt{2} \; p/p_0 + (p/p_0)^2}$$

The filter can be adjusted to control the closed,loop tracking noise bandwidth $B_n=1.06 \; P_o$. Alternate loop filters can be employed but this one is a good example.

The acquisition performance of the quasi-coherent DLL (QCDLL) can be adjusted by:

a) Widening the linear region of the discriminator characteristic by widening the pulse width to values greater then δT. This approach widens the quasi linear region of R' (ε)R(ε).

b) Increasing the loop gain while keeping the reference tracking channel pulse width equal to δT. This approach increases the acquisition range.

Figure 7A:
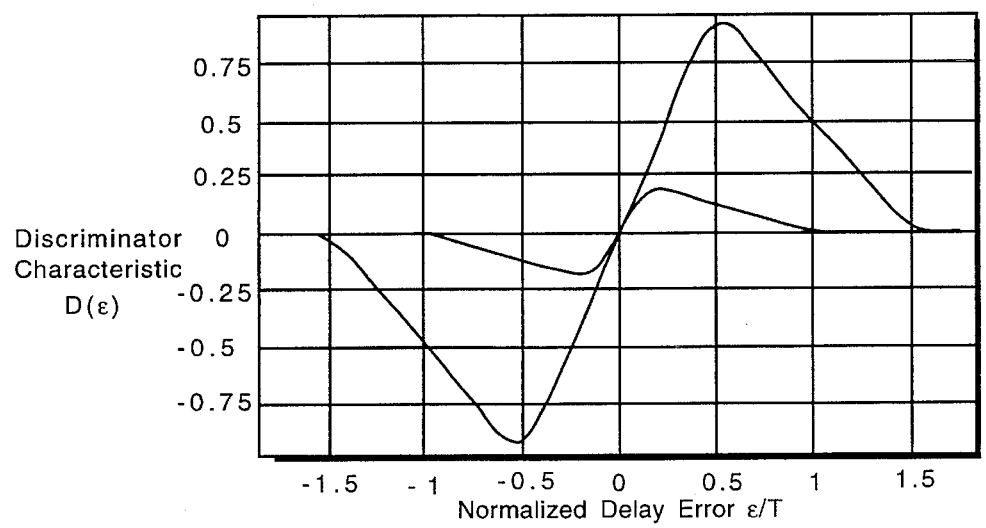
FIG. 7B shows how additional gain in the tracking channel can be used to restore tracking robustness, the gain in the discriminator curve for a rise time/chip ratio of 0.125 has been increased by a factor of 4.
Figure 7B:
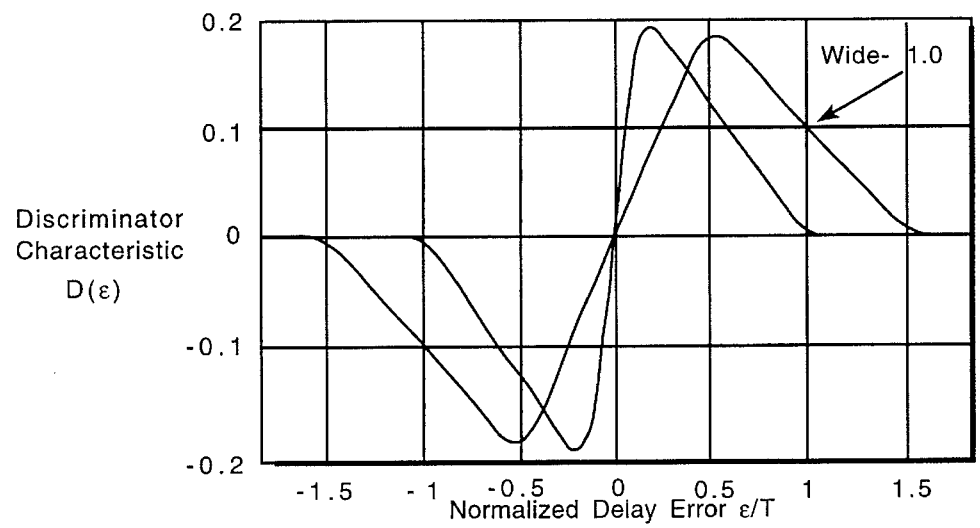

FIGS. 7a and 7b show a comparison of the discriminator characteristics for a QCDLL which uses the near optimal tracking channel reference s' $(t+\hat{\tau})/\delta T$ with increased gain of 5 to one, as compared to a tracking channel reference which is optimal for a longer rise time $\delta T/T=1.0$. In both instances the received signal is the same with a rise time $\delta T/T-0.25$.

In FIG. 7a, both characteristics are compared where the pulse "doublets" of the tracking channel reference both have unit amplitude. Both produce the same loop gain. However, the optimal (smaller and more narrow) discriminator characteristic has only ¼ the mean square noise error.

In FIG. 7b, the relative gain of the optimal discriminator has been increased by 5 to one so that it has essentially the same peak amplitude and hence correction voltage as the wider discriminator characteristic. Thus, either can be used during the acquisition mode of the QCDLL during the short time require to reduce the delay error.

Thus, during acquisition one can either widen the tracking channel pulse doublets to T or increase the loop gain. After acquisition the reference should be adjusted to the optimal value $\delta T$ to match the received signal rise time.

The QCDLL offers the following advantages over a conventional noncoherent early-late gate DLL or even a noncoherent early late gate DLL with narrow correlator spacing:

1) Improved noise performance. The punctual reference channel is exactly phased with respect to the received code phase (delay).
2) The discriminator curve width is only $\pm T$ rather than $\pm (3/2)T$. Thus multipath interference beyond $\pm T$ is always rejected for this QLDLL where it is not in the conventional $\pm T/2$ early late DLL.
3) There are only 3 nonlinear operations for the QCDLL whereas the conventional noncoherent early late gate DLL requires 4 (2 correlators+2 squaring operations).

Although the QCDLL requires that the punctual and tracking filters be accurately matched in delay, this matching can be performed easily with digital filtering. Digital filtering however can easily maintain the phase balance of the I/Q channels.

Digital Implementation

Figure 8:
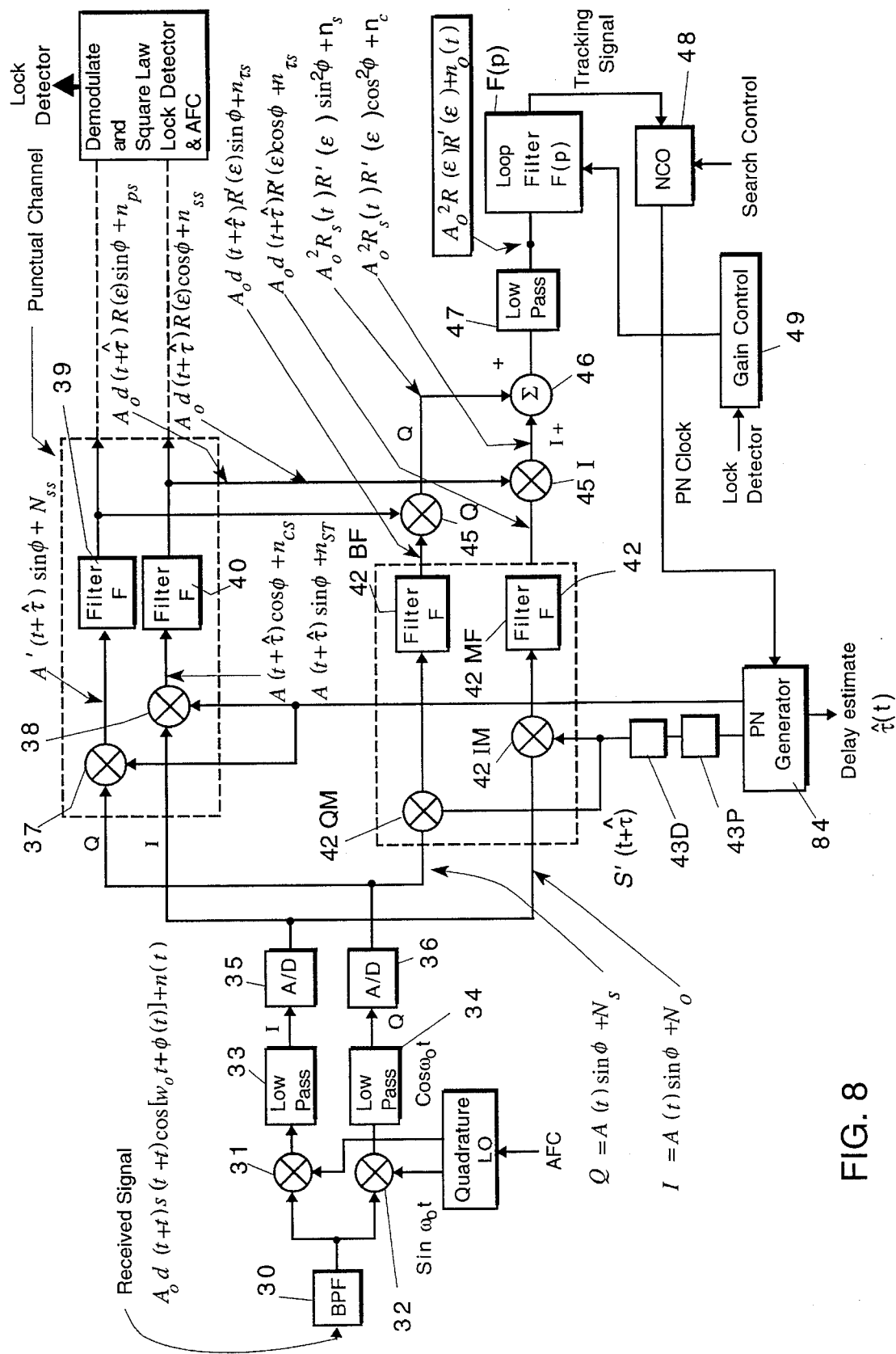
FIG. 8 is a block diagram of a digital implementation of the near optimal quasi-coherent delay lock loop.

One embodiment of the QCDLL in digital form is shown in FIG. 8. For purposes of this discussion, assume that the binary data modulation $d(t)=\pm 1$ although the tracking system also applies for more general modulation. The QCDLL also applies if the PN signal has independent PN codes on both in-phase and quadrature signals such as the C/A and P-code for GPS. The signal s(t) and differentiated reference signals are then complex waveforms but the same design applies. Assume that the bit rate $f_d$ of the data modulation is much less than the chip rate $f_c=1/T$ of the PN sequence waveform. Further assume that the PN waveform s(t) has finite rise time (true for any realizable signal) and that the rise time is $\delta T<T$. For simplicity we assume that the waveform is trapezoidal in shape.

The received signal is received with additive white gaussian noise n(t) as shown in FIG. 8. The received signal plus noise is then filtered with a bandpass filter 30 and downconverted 31, 32 to baseband with in-phase, I, and quadrature, Q, Samples taken filtered 33, 34 and A/D converted 35, 36 to produce $I=A(t) \cos \phi(t)+N_c(t)$ $Q=A(t) \sin \phi(t)+N_s(t)$ where the samples are taken at $t=t_k=kT/n$. Alternatively, the same I, Q digital samples can be taken by properly sampling at IF frequencies.

The I, Q sample pairs are then processed in parallel by both punctual and tracking channels. In the upper channel the punctual channel, both the I and Q channels are multiplied 37, 38 by $I s(t+\hat{\tau})$ where $\hat{\tau}$ is the estimate of path delay $\tau$ in the received signal.

As an approximation the reference signal can be the zero rise time equivalent of s(t) which we denote as $s_o(t)$. The I,Q outputs of the punctual channel then have the form after filtering 39, 40 of $A_o d(t+\tau+T_f) R(\epsilon) \sin \omega_o(t+T_f)+n_{ps}(t)$ $A_o d(t+\tau+T_f) R(\epsilon) \cos \omega_o(t+T_f)+n_{pc}(t)$ where the autocorrelation function is $R(\epsilon)=E[s(t)s(t+\epsilon)]$ or $R_{so}(\epsilon)=E[s(t)s_o(t+\epsilon)]$ depending on which form of reference signal is employed. The delay error $\epsilon=\tau-\hat{\tau}$. The delay $T_f$ is the delay of filters 39, 40. The noise $n_{ps}(t)$, $n_{pc}(t)$ includes both the effects of thermal noise and the much smaller effect of self noise (Spilker, 1977). As an alternative to so(t) we can employ a ternary signal $s_\delta(t)$ which is zero during the transition internal $\delta T$ sec and otherwise is equal to s(t), and thus has a duty factor $1-\delta T/2T$. The I & Q channels are conventionally processed in demodulate, square low lock detector and AFC circuit 41 and data signals are supplied to a utilization device (not shown), and lock detector.

The tracking channel 42 employs a reference signal s' $(t+\hat{\tau})$ or an approximation to that signal from a filtered 43F and differentiated 43D output 43 of PN generator 44. For example, for a trapezoidal shaped PN signal the reference signal s' $(t+\hat{\tau})$ is a PN sequence of narrow pulses of width $\delta T$ (as shown earlier in FIG. 3), the rise time of the reference signal. The signal s' (t) is a ternary signal which is zero in amplitude except during transitions which occur only in half of the chip intervals for a balanced PN code (equal number of "o's" and "1's"). Thus, the reference signal has a duty factor of $\Delta=\delta T/2T$ and only this fraction, $\Delta$, of the thermal noise passes through that channel. The outputs of the tracking channel after low pass filtering is then $A_o d(t+\tau+T_f)R'(\epsilon) \sin \phi(t+T_f)+n_{ts}(t)$ $A_o d(t+\tau+T_f) R'(\epsilon) \cos \phi(t+T_f)+n_{tc}(t)$ The signals in the tracking and punctual channels have an added filter delay $T_f$ which is less than or equal to the data symbol width $T_d=1/f_d$. The two sets of digital data filters are exactly matched so that the signal components match one another. The filters must be sufficiently broad to pass any residual doppler frequency shift or other frequency offset in the received signals.

Figure 1A:
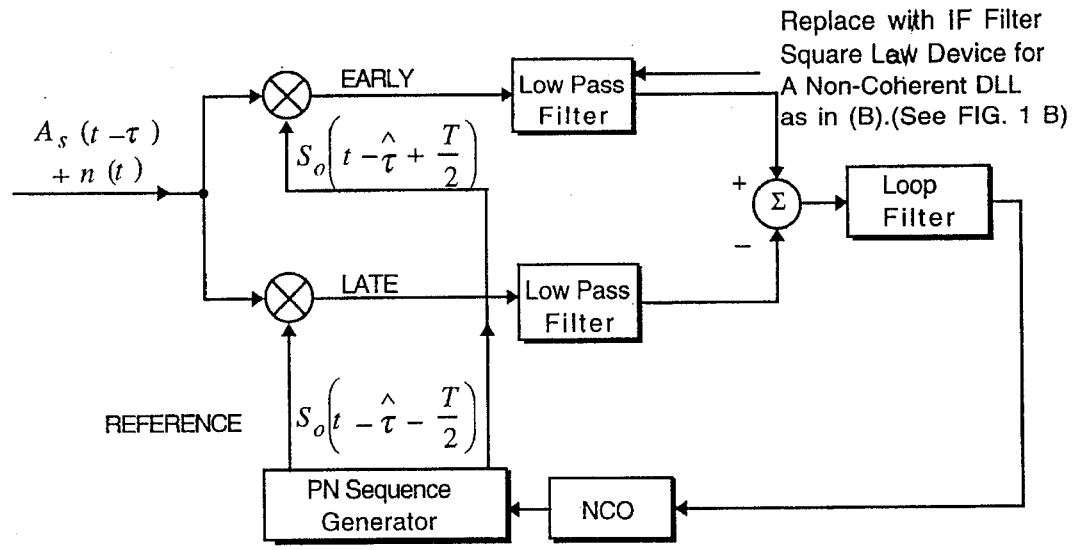
FIGS. 1A and 1B, respectively, illustrate coherent and noncoherent delay lock loop circuits typical of the prior art.
Figure 1B:
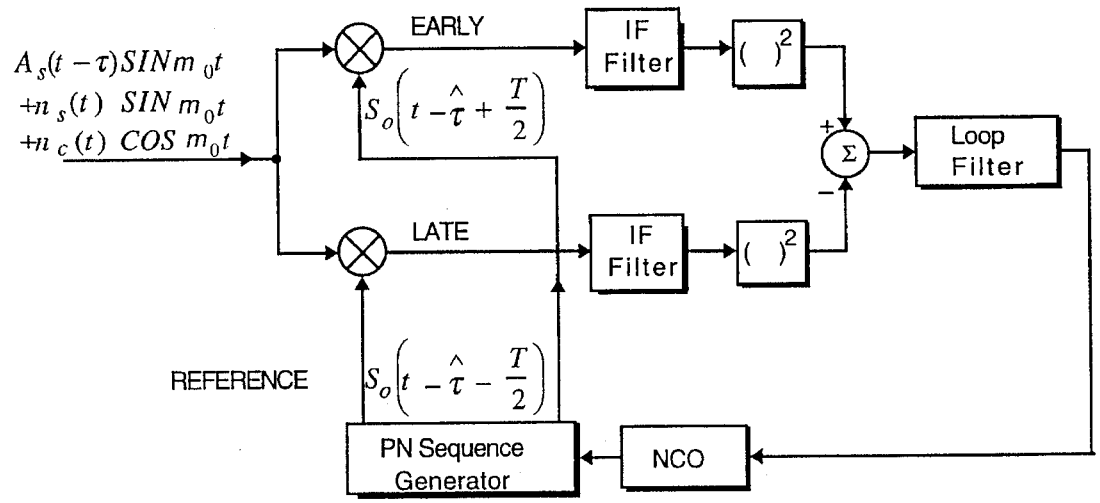

The products 45, 46 of the punctual and tracking channel outputs are then $A_o^2 R(\epsilon) R'(\epsilon) \cos^2\phi(t+T_f)+n_c(t)$ and $A_o^2 R(\epsilon) R'(\epsilon) \sin^2\phi(t+T_f)+n_s(t)$ These two terms are summed 46 and filtered 47 to produce the tracking output $A_o^2 R_s(\epsilon) R'(\epsilon)+n_o(t)$ As shown earlier, the product $R(\epsilon)R'(t)$ has a variation with $\epsilon$ that is proportional to $\epsilon$ for small $\epsilon$ (see FIG. 6) and a slope related to the rise time of the signal. Furthermore, because of the time gating of s' (t), the noise has been significantly reduced relative to the conventional noncoherent delay lock loop (FIG. 1b) with $\pm$ T/2 separation or the modified code tracking loop of Simon, et al (p. 191), 1985; Holmes (p. 481), 1990 which used the same code separation.

The loop filter, F(p), then is selected with gain and parameters (usually a second-order closed-loop response) (see Spilker, 1977) to track the dynamics of the delay variable $\tau(t)$. The delay varies because the relative transmitter and receiver position varies with time as is common in the global positioning system (GPS) applications. The tracking signal,is applied to number controlled oscillator 48 which provides the PN clock signal to PN generator 44. The loop gain 49 of the tracking channel reference signal is adjusted during acquisition and then the lop gain is reduced to its optimal (thermal noise steady state condition) once the loop has completed its acquisition mode.

Because the discriminator characteristic $D(\epsilon)=-R(\epsilon)R'(\epsilon)$ of the QCDLL is not as wade, nor as large in amplitude as the conventional DLL, the loop gain can be increased during the acquisition and pull-in operation. For delay error beyond the linear range but still $\epsilon T$, the QCDLL still gives a correction voltage of proper sign. Alternatively, the reference signal in the tracking channel can use a pulse width which is larger than $\epsilon T$ during initial acquisition, and then narrows after the signal is acquired.

An advantage in addition to the improved noise performance is the decreased sensitivity to multipath. This advantage is created by the decreased width of the discriminator characteristic $D(\epsilon)$ rather than the usual noncoherent wide correlator which has a width $\pm 1.5T$.

A key aspect of this delay lock loop is its digital implementation. This approach permits one to match the delay and phase in the filters in each channel. With ordinary analog filters and the relatively long delay required for a GPS receiver (where the ratio of the RF signal bandwidth to IF filter bandwidth is on the order of $10^7/10^3=10^4$), the time delay stability in these filters would have to be proportionality high. That would have been very difficult for an analog filter, but it is easy for digital filtering. If the filter delays and phases were not stable and the carrier phase were to drift 180°, the loop gain would reverse sign and become unstable and would not work properly.

The present invention combines the following:

Form the product of filtered punctual and tracking channels to get quasi-coherent operation.

Use a differentiated signal or a close approximation such as the ternary signal which is optimum for a trapezoidal signal.

Change the loop gain or tracking reference signal during acquisition.

Implement all of the above in digital form so that it is practical.

ADVANTAGES OF THE INVENTION

This invention improves tracking accuracy of the delay lock loop in the presence of noise, as compared to prior art delay lock loops.

The invention is simpler to implement than other noncoherent techniques when digitally implemented, since only one additional correlator (beyond the two required to track and to derive error and data signals) is required, rather than the two required for conventional early correlator-late correlator delay lock loops.

The invention has nearly the performance of, but does not suffer from the problems of coherent delay lock loops, which are subject to losing code lock when a cycle slippage occurs in the carrier tracking operation. The QCDLL receiver uses a simple matched punctual channel correlator to recover an estimate of the carrier and data modulation using filtering rather than employing fragile hard decisions and coherent phase lock loops. Thus the receiver achieves nearly the same performance advantages as a coherent DLL without the sensitivity of carrier phase cycle slips.

In this invention, the reference signal for the tracking correlator is optimal, a differentiated reference signal whose value is near zero except during transitions of the pseudonoise code. The tracking correlator is therefore enabled to capture the tracking information while at the same time removing the noise that occurs between the pseudonoise signal's transitions.

It will be appreciated that there has been shown and described preferred embodiments of the invention and it will be appreciated that various other embodiments, modifications and adaptations of the invention will become readily apparent to those skilled in the art. It is intended that such other obvious adaptations and modifications be incorporated within the true spirit and scope of the claims appended hereto.

What is claimed is:

1. A delay lock loop comprising:

first and second correlator circuits, each having first and second inputs, a signal output circuit which supplies an input voltage at a suitable level and center frequency to said first input of each of said correlator circuits, said input voltage including a pseudonoise signal of varying time delay with respect to a pseudonoise reference signal, a pseudonoise generator providing an output voltage which is a predictable time sequence pattern of binary values occurring at the rate established by said generator, the sequence pattern being the same as that in the input signal excepting for a variable time delay, an controlled oscillator whose instantaneous output frequency is controlled by the instantaneous value of a tracking voltage, and whose output is fed to said pseudonoise generator, said first correlator receiving the output of said pseudonoise generator, said second correlator receiving the time-differentiated output of said pseudonoise generator, first and second filters at the outputs of said first and second correlators, respectively, to remove substantially all except the intermediate frequency components of the correlator outputs or the equivalent in-phase and quadrature components thereof, a third correlator receiving the outputs of said filters as its inputs, and filter means at the output of said third correlator for removing intermediate frequency and other high-frequency components from the correlator output to produce a tracking signal and feeding said tracking to said controlled oscillator, whereby the time sequence of the output of the pseudonoise oscillator follows that of the input signal, while the tracking voltage is a measure of the instantaneous time delay.

2. A delay lock loop comprising:

a local pseudonoise generator for generating a locally generated pseudonoise signal, or a filtered version thereof, a signal correlator having as a reference input said locally generated pseudonoise signal, means for providing a time derivative signal from said pseudonoise signal (finite rise time), a tracking channel including a tracking correlator having a reference input connected to receive said time derivative signal of said pseudonoise signal, said signal correlator and said tracking correlator being connected to receive the same signal input which includes a portion modulated by a pseudonoise signal whose pattern is the same as that of the locally generated pseudonoise signal but with a time delay, a third correlator in said tracking channel, said third correlator having inputs which are the electrically filtered outputs of said signal and tracking correlators, and wherein the filtered output of the third correlator controls the time delay in the locally generated pseudonoise signal to track the pseudonoise component in the received signal.

3. A delay lock loop as defined in claim 2, including:

means to control the rise time of said reference pseudonoise signal independently such that its derivative comprises alternating finite-width positive and negative pulses centered on transitions of the reference pseudonoise signal, whereby the effect that the second (tracking) correlator's output is non-zero only during periods when the pseudonoise input signal experiences transition, so that all of the useful signal is retained and most of the noise rejected.

4. A delay lock loop as defined in claim 2, implemented using digital electronic multipliers and digital filters, wherein the tracking correlator samples the input signal once prior to the pseudonoise transition, and again at an equal interval following the transition, and the signal correlator samples midway between transitions.

5. A delay lock loop as defined in one of claims 2–4 including means to adjust the gain of said tracking channel during acquisition and then reducing the channel gain when the tracking channel has completed acquisition.

* * * * *